(12) United States Patent
Binford (10) Patent No.: US 11,713,492 B2
(45) Date of Patent: Aug. 1, 2023

(54) OFFSET LINK FOR ROLLER CHAIN WITH ENHANCED STRENGTH

(71) Applicant: iwis drive systems, LLC, Indianapolis, IN (US)

(72) Inventor: Andrew J. Binford, Indianapolis, IN (US)

(73) Assignee: Iwis Drive Systems, LLC, Indianapolis, IN (US)

( * ) Notice: Subject to any disclaimer, the term of this patent is extended or adjusted under 35 U.S.C. 154(b) by 335 days.

(21) Appl. No.: 16/878,700

(22) Filed: May 20, 2020

(65) Prior Publication Data
US 2020/0407813 A1 Dec. 31, 2020

Related U.S. Application Data

(60) Provisional application No. 62/866,095, filed on Jun. 25, 2019.

(51) Int. Cl.
*C21D 9/00* (2006.01)
*F16G 13/06* (2006.01)
(Continued)

(52) U.S. Cl.
CPC ........... *C21D 9/0087* (2013.01); *B65G 39/20* (2013.01); *C21D 1/607* (2013.01); *C21D 6/002* (2013.01); *C22C 38/18* (2013.01); *F16G 13/06* (2013.01); *C21D 2211/002* (2013.01); *C21D 2211/008* (2013.01)

(58) Field of Classification Search
CPC ............ C21D 9/0087; C21D 2211/002; C21D 2211/008; F16G 13/06
See application file for complete search history.

(56) References Cited

U.S. PATENT DOCUMENTS

| 2,182,443 A | 12/1939 | McAninch |
| 2,199,292 A | 4/1940 | Pierce |

(Continued)

FOREIGN PATENT DOCUMENTS

| JP | 59-226732 | 12/1984 |
| JP | 2506016 | 8/1996 |
| JP | 09078136 A | * 3/1997 |

OTHER PUBLICATIONS

International Association of Drilling Contractors, IADC Drilling Manual (Sample Copy), 2014, 5 pages.
(Continued)

*Primary Examiner* — Anthony J Zimmer
*Assistant Examiner* — Sean P. O'Keefe
(74) *Attorney, Agent, or Firm* — Bose McKinney & Evans LLP (57) ABSTRACT

A roller chain having at least one pair of offset links wherein the offset link plates are made with a steel having a high chromium content and are through-hardened using an austempering heat treatment (such as a salt bath quench). The resulting offset link plates may have a hardness in range of 44-50 HRC on the Rockwell hardness scale and a bainite metallurgical microstructure. The offset link plates may also have a greater fatigue strength than at least one of the inner link plates and the outer link plates. The inner and outer link plates may be formed out of a plain carbon steel which is heated, quenched and tempered to produce a martensite microstructure.

19 Claims, 4 Drawing Sheets

(51) Int. Cl.
  *C21D 1/607*  (2006.01)
  *C22C 38/18*  (2006.01)
  *C21D 6/00*  (2006.01)
  *B65G 39/20*  (2006.01)

(56) References Cited

U.S. PATENT DOCUMENTS

| | | | | |
|---|---|---|---|---|
| 3,054,300 | A | * | 9/1962 | Bowman ................. F16G 13/06 |
| | | | | 474/230 |
| 5,651,938 | A | * | 7/1997 | Thomson ................ C22C 38/12 |
| | | | | 420/119 |
| 5,753,055 | A | | 5/1998 | Liu |
| 6,843,867 | B1 | | 1/2005 | Foerster et al. |
| 2003/0159425 | A1 | | 8/2003 | Matsuura |
| 2005/0090348 | A1 | | 4/2005 | Tohara |
| 2007/0111835 | A1 | | 5/2007 | Ogo et al. |
| 2010/0167858 | A1 | * | 7/2010 | Baba ....................... F16G 13/18 |
| | | | | 474/231 |
| 2016/0153525 | A1 | * | 6/2016 | Eda .......................... C21D 1/22 |
| | | | | 148/333 |
| 2020/0039760 | A1 | | 2/2020 | Binford |

OTHER PUBLICATIONS

International Search Report and Written Opinion of the International Searching Authority, PCT/US2020/039303, dated Sep. 17, 2020, 12 pages.

\* cited by examiner

OFFSET LINK FOR ROLLER CHAIN WITH ENHANCED STRENGTH

CROSS REFERENCE TO RELATED APPLICATIONS

This application claims priority under 35 U.S.C. 119(e) of U.S. provisional patent application Ser. No. 62/866,095 filed on Jun. 25, 2019 entitled OFFSET LINK FOR ROLLER CHAIN WITH ENHANCED STRENGTH the disclosure of which is hereby incorporated herein by reference.

BACKGROUND

The present invention relates to chains and, more specifically, to roller chains having an offset link.

Roller chains are chains that include a series of rollers held together by side links and are driven by a toothed gear member or sprocket. Such roller chains are commonly used to transmit mechanical power and are found on a wide variety of different types of machinery and equipment.

Typically, such chains include alternating sets of inner links and outer links. When the chain is secured to itself to form an endless loop, it will typically have an even number of pitches or links. When such endless loop roller chains include an odd number of links, it is common for one pair of links to be formed by offset links which have a bend and function as inner links at one end and outer links at the opposite end.

When a roller chain includes a pair of offset links, the offset links typically have a reduced fatigue strength due to the bend in the links. When the offset links are formed out of the same material and dimensions as the base chain links, differing only by the bend placed in the offset links, it is a general industry standard to assume that the offset links have a fatigue strength that is 25% less than the base chain. The reduction of strength of the chain as a whole due to the presence of offset links is clearly undesirable.

SUMMARY

The present invention provides an improved chain having a pair of offset links wherein the offset links have enhanced strength.

The invention comprises, in one form thereof, a roller chain having at least one pair of offset link plates wherein the offset link plates are made with a steel having a high chromium content and are through-hardened using an austempering heat treatment (salt bath quench) that provides offset link plates with a hardness in range of 44-50 HRC on the Rockwell hardness scale and a bainite metallurgical microstructure.

In some embodiments, the roller chain includes inner and outer links that are formed out of carbon steel that is through-hardened using oil quenching and tempering that provides the inner and outer link plates with a hardness in the range of 38-48 HRC on the Rockwell hardness scale and a tempered martensite metallurgical microstructure.

In one embodiment, the invention provides a roller chain that includes a plurality of inner link plate pairs and a plurality of outer link plate pairs wherein the plurality of inner link plate pairs and the plurality of outer link plate pairs alternate along the length of the roller chain; a plurality of roller assemblies centrally positioned at regularly spaced intervals along the chain length and extending between individual link plates forming the plurality of inner link plate pairs; and at least one offset link. The offset link includes a pair of offset link plates wherein the offset link has a first end connected to one inner link plate pair of the plurality of inner link plate pairs and the offset link has a second end connected to one outer link plate pair of the plurality of outer link plate pairs and wherein the pair of offset link plates have a greater fatigue strength than at least one of the plurality of inner link plate pairs and the plurality of outer link plate pairs.

In such an embodiment, the pair of offset link plates may be formed out of an austempered steel material having a bainitic microstructure. The plurality of inner link plate pairs and the plurality of outer link plate pairs may be formed of a hardened carbon steel material having a tempered martensite microstructure. In some embodiments, the plurality of inner link plate pairs and the plurality of outer link plate pairs have a Rockwell hardness within a range extending from 38 to 48 HRC and the offset link plates have a Rockwell hardness within a range extending from 44 to 50 HRC.

The pair of offset link plates can be formed of a steel alloy having a chromium content within a range extending from 0.4% to 1.1% (by weight) and a carbon content within a range extending from 0.3% to 0.6% (by weight). The plurality of inner link plate pairs and the plurality of outer link plate pairs can be formed of a steel alloy having a carbon content within a range extending from 0.3% to 1.0% (by weight).

The individual plates of the plurality of inner link plate pairs, the plurality of outer link plate pairs and the pair of offset link plates may all have a common thickness.

The invention comprises, in another embodiment thereof, a roller chain that includes a plurality of inner link plate pairs and a plurality of outer link plate pairs wherein the plurality of inner link plate pairs and the plurality of outer link plate pairs alternate along the length of the roller chain; a plurality of roller assemblies centrally positioned at regularly spaced intervals along the chain length and extending between individual link plates forming the plurality of inner link plate pairs; and at least one offset link. The offset link includes a pair of offset link plates with the offset link having a first end connected to one inner link plate pair of the plurality of inner link plate pairs and a second end connected to one outer link plate pair of the plurality of outer link plate pairs. Individual plates of the plurality of inner link plate pairs, the plurality of outer link plate pairs and the pair of offset link plates all have a common thickness. The plurality of inner link plate pairs and the plurality of outer link plate pairs are formed of a hardened carbon steel material having a tempered martensite microstructure. The pair of offset link plates are formed out of an austempered steel material having a bainitic microstructure having a Rockwell hardness within a range extending from 44 to 50 HRC and wherein the steel material forming the pair of offset link plates has a chromium content within a range extending from 0.4% to 1.1% (by weight) and a carbon content within a range extending from 0.3% to 0.6% (by weight).

In some embodiments, the hardened steel material forming the plurality of inner link plate pairs and the plurality of outer link plate pairs has a carbon content within a range extending from 0.3% to 1.0% (by weight).

In some embodiments, the individual link plates forming the plurality of inner link plate pairs and the plurality of outer link plate pairs are all formed out of planar sheet material and the pair of offset link plates are formed out of sheet material having an inner plate section disposed in a first plane, an outer plate section disposed in a second plane parallel with the first plane and a transition section connecting the inner plate section and the outer plate section. The individual link plates forming the plurality of inner link plate pairs and the outer link plate pairs may all be formed out of the same material and have the same configuration.

The invention comprises, in yet another embodiment thereof, a method of manufacturing a roller chain. The method includes forming a plurality of inner link plates and a plurality of outer link plates out of a carbon steel material by: (a) heating the plurality of inner link plates and the plurality of outer link plates to a temperature above the austenitizing temperature of the carbon steel material; (b) quenching the plurality of inner link plates and the plurality of outer link plates to rapidly cool the plurality of inner link plates and the plurality of outer link plates to a temperature below the martensite start temperature of the carbon steel material; and (c) tempering the plurality of inner link plates and the plurality of outer link plates. The method also includes forming a pair of offset link plates out of a steel alloy by: (a) heating the pair of offset link plates to a temperature above the austenitizing temperature of the steel alloy; and (b) quenching the pair of offset link plates by rapidly cooling the pair of offset link plates to a temperature above the martensite start temperature of the steel alloy. The method also includes assembling the plurality of inner link plates, the plurality of outer link plates and a plurality of roller assemblies together to form a length of chain having pairs of the inner link plates alternate with pairs of the outer link plates and wherein the pair of offset link plates connect one of the pairs of the inner link plates to one of the pairs of the outer link plates.

In some embodiments of such methods, the steel alloy forming the pair of offset link plates has a chromium content within a range extending from 0.4% to 1.1% (by weight) and a carbon content within a range extending from 0.3% to 0.6% (by weight) and wherein, after quenching the pair of offset link plates, the pair of offset link plates have a Rockwell hardness within a range extending from 44 to 50 HRC. The pair of offset link plates may also be quenched in a molten salt bath.

In some embodiments of the method, the carbon steel material forming the plurality of inner link plates and the plurality of outer link plates has a carbon content within a range extending from 0.3% to 1.0% (by weight) and wherein, after quenching the plurality of inner link plates and the plurality of outer link plates, the plurality of inner link plates and the plurality of outer link plates have a Rockwell hardness within a range extending from 38 to 48 HRC. Such embodiments may further include quenching the plurality of inner link plates and the plurality of outer link plates in an oil bath and tempering the plurality of inner link plates and the plurality of outer link plates by allowing them to cool by losing heat to the ambient air.

Is some embodiments, the method further includes stamping the plurality of inner link plates and the plurality of outer link plates from a sheet of the carbon steel material before the step of heating the plurality of inner link plates and the plurality of outer link plates; stamping the pair of offset link plates from a sheet of the steel alloy and bending the individual offset link plates stamped from the sheet of the steel alloy at a transition section of the offset link plates whereby the individual offset link plates have an inner plate section disposed in a first plane, an outer plate section disposed in a second plane parallel with the first plane and the transition section connects the inner plate section and the outer plate section; wherein individual plates of the plurality of inner link plates, the plurality of outer link plates and the pair of offset link plates all have a common thickness.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

Figure 1:
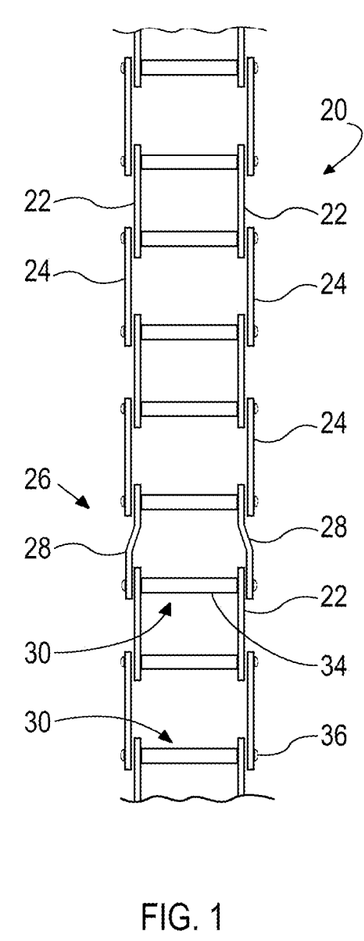
FIG. 1 is a schematic view of a section of roller chain having an offset link.
Figure 2:
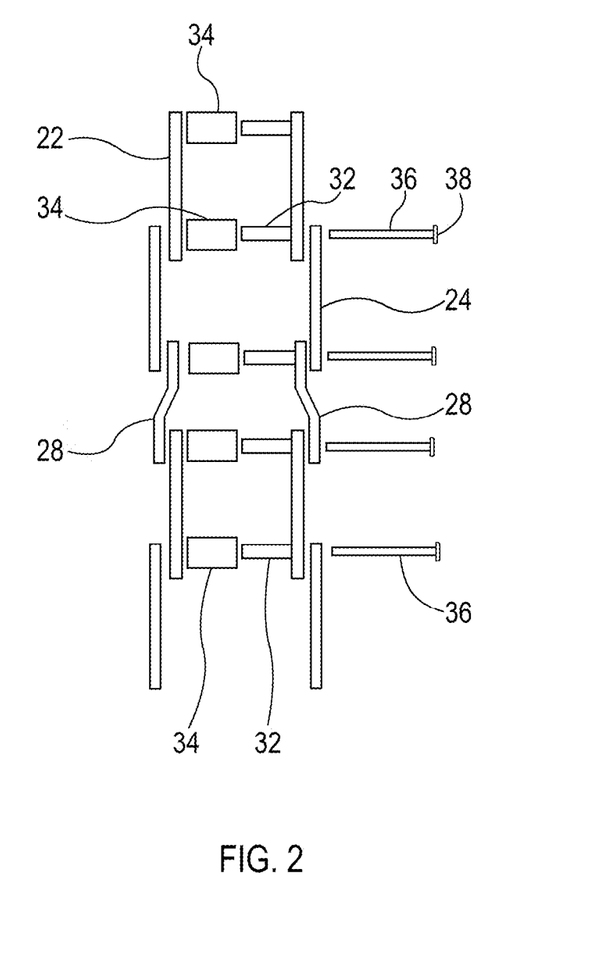
FIG. 2 is an exploded view of a section of roller chain having an offset link.
Figure 3:
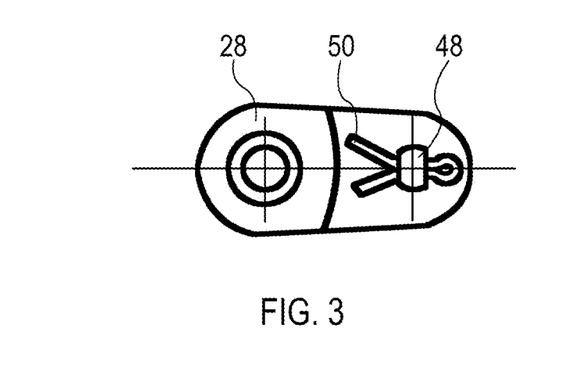
FIG. 3 is a side view of an offset link.
Figure 4:
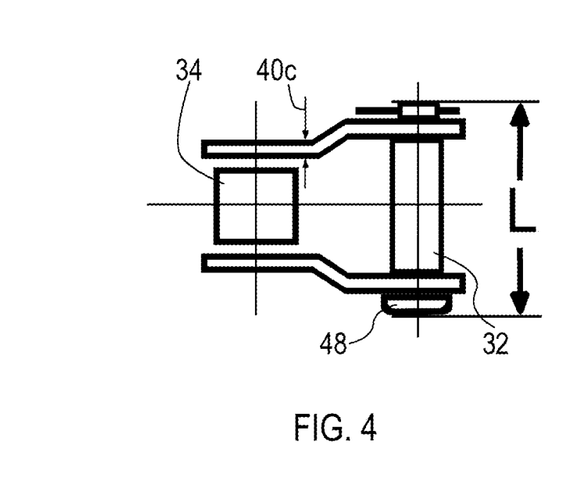
FIG. 4 is a top view of the offset link of FIG. 3.
Figure 5:
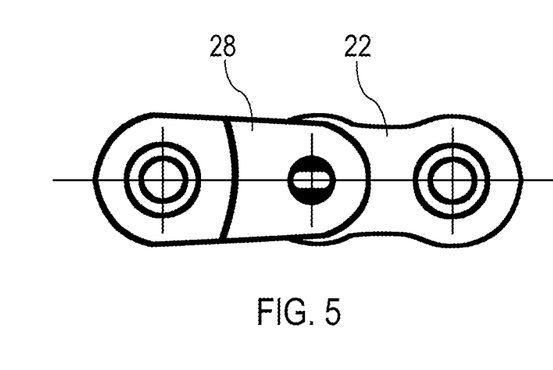
FIG. 5 is a side view of an offset link attached to another link.
Figure 6:
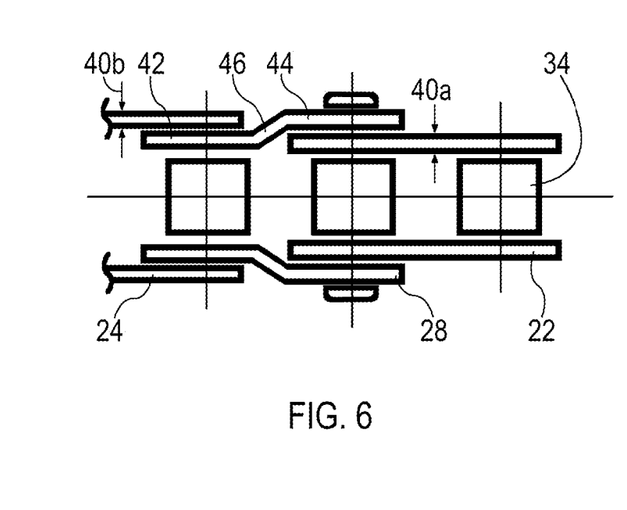
FIG. 6 is a top view of the offset link and attached link of FIG. 5.

A roller chain 20 is depicted in FIGS. 1 and 2. As can be seen in these figures, the illustrated roller chain includes a plurality of connected links which alternate between links formed by a pair of inner link plates 22 and those formed by a pair of outer link plates 24. The depicted roller chain 20 also includes an offset link 26 formed by a pair of offset link plates 28. Each of the inner and outer link plates 22, 24 is formed out of a planar sheet material and has a generally FIG. 8 shape (when viewed from the side such as in FIG. 5) with a pair of openings formed therethrough for receiving a connector such a pin. The offset link plate 28 is formed out of a planar material but is subsequently bent to form an offset as will be discussed in greater detail below. Offset link plate 28 also includes a pair of openings for receiving a connector such as a pin.

A series of roller assemblies 30 extends between the opposing link plates of each pair of link plates. The design of roller assemblies 30 is best understood with reference to the exploded schematic view of FIG. 2. Each roller assembly 30 includes a hollow cylindrical bushing 32 that is positioned between the inner link plates. Bushing 32 is commonly fixed to one of the inner link plates 22, e.g., by a press fit engagement, and defines the spacing between the opposing inner link plates 22. A hollow cylindrical roller 34 is rotatably positioned on bushing 32. A connecting pin 36 is inserted through openings in the inner and outer link plates 22, 24 to secure the link plates 22, 24 together with the roller assembly 30 and is inserted through bushing 32 and roller 34. The connecting pin 36 may have a preformed head 38 on one end that is too large to pass through the opening in the outer link plate 24. The opposite end of the pin is peened or otherwise deformed after it has been inserted through the link plates and other roller assembly components to thereby secure the link.

When a roller chain 20 is formed into an endless loop and includes an even number of total links, the entire chain can be formed by alternatingly connecting a pair of inner link plates 22 with a pair of outer link plates 24. However, when it is necessary for a roller chain to form an endless loop out of a length of chain formed by an odd number of links, it is necessary to use an offset link 26 which is also sometimes referred to as a half-link. A single offset link 26 connects a pair of outer link plates 24 with a pair of inner link plates 22 which would otherwise require two sets of link plates (i.e., a pair of inner link plates 22 and a pair of outer link plates 24).

Although it is possible to form a roller chain 24 having a plurality of offset links 26, it will generally only be desirable to use a single offset link 26 and generally only when a total number of odd links are necessary.

The thicknesses 40a, 40b, 40c of the sheet material used to form inner link plates 22, outer link plates 24 and offset link plates 28 are all the same in the illustrated embodiment. Using the same material thickness for all three different types of plates allows for manufacturing efficiencies. The same material and the same process used to harden the material is used for both inner link plates 22 and outer link plates 24. As further discussed below, a different material and different hardening process is used to form offset link plates 28.

The outer link plates 24 may have the identical shape and configuration as inner link plates 22 whereby the inner and outer link plates 22, 24 are interchangeable, or, one of the inner and outer link plates may have a slightly larger surface area than the other of the inner and outer link plates when viewed from the side of the chain. In other words, the major planar surface of outer link plates 24 defining a roughly FIG. 8 shape, may have a surface area slightly greater or slightly smaller than the corresponding major planar surface of inner link plate 22.

Offset link 26 is shown in greater detail in FIGS. 3-6. Each of the offset link plates 28 includes an inner plate section 42 and an outer plate section 44 and a transition section 46 defining a bend that connects the inner plate section 42 and the outer section 44. Each offset link plate 28 includes an opening in the inner plate section 42 and an opening in the outer section 44.

For each pair of offset link plates 28, a bushing 32 is positioned between the openings in the two inner plate sections 42 in the same manner that bushings are positioned between openings in inner link plates 22. A roller 34 is positioned on the bushing 32 between the inner plate sections 42. A pair of outer link plates 24 are positioned laterally outwardly of the inner plate sections 42 and are secured to the inner plates sections 42 with a pin 36. The pin 36 also holds the bushing 32 and roller 34 in place between inner plate sections 42.

The outer plate sections 44 are positioned laterally outwardly of a pair of inner link plates 22 between which are positioned a bushing 32 and a roller 34. In the illustrated embodiment, a clevis pin 48 having a head at one end and a transverse opening at the other end for receiving a cotter pin 50 is used to secure the outer plate sections 44 with the inner link plates 22, bushing 32 and roller 34. The use of clevis pin 48 and a removable cotter pin 50 allows the connection between outer plate sections 44 and the inner link plates 22 to be non-destructively detached and re-attached. This can be useful when it is necessary to change the length of the chain by adding or removing links or when it is necessary to form an endless loop with the chain or detach the chain from itself when it has already been formed into an endless loop. This can be particularly useful when servicing equipment and it is necessary to remove and then re-install a chain that is in the form of an endless loop.

Figure 7:
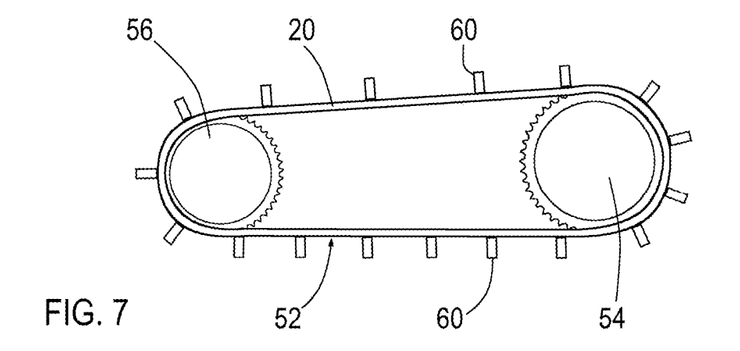
FIG. 7 is a schematic side view of a roller chain and sprocket assembly.

Roller chain 20 may be used in a wide variety of application. For example, FIG. 7 provides a schematic view of an application for roller chain 20 in which roller chain 20 has been formed into an endless loop 52. In this schematic representation, chain 20 is engaged with two sprockets 54, 56 which take the form of a toothed gear. Sprockets 54, 56 are conventional sprockets and have teeth which engage the rollers 34 of chain 20. In this embodiment, sprocket 54 is a driven sprocket and drives the rotation of chain 20. Chain 20, in turn, causes rotation of second sprocket 56. In the embodiment of FIG. 7, chain 20 is shown with paddles 60 attached to chain 20 as is commonly done in a conventional grain elevator of a combine to move material from the cutting head into the combine.

Figure 8:
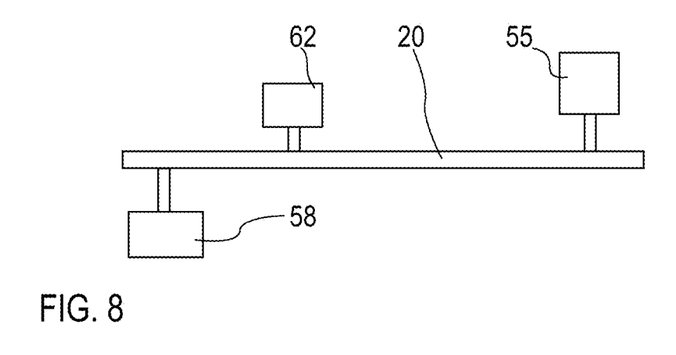
FIG. 8 is a schematic top view of a roller chain assembly.

Depending upon the application, the rotation of sprocket 56 may be the force that provides the functionality of the application as represented by box 58 in FIG. 8. For example, an engine or other source of torque, represented by box 55 in FIG. 8 may turn first sprocket 54, which in turn causes the rotation of chain 20 and sprocket 56. If sprocket 56 is coupled to the wheel of a vehicle, the driving of the wheel may then cause the vehicle to move.

Alternatively, paddles 60 or other components 62 could be attached directly to the chain 20. In such a case, sprocket 56 may be an idler or tensioning sprocket which simply keeps the chain properly positioned and at the proper tension. Such an application wherein the chain itself drives the functionality of the application with a functional component 62 attached to the chain, instead of or in addition to second sprocket 56 providing a driving force to an application 58, is schematically represented in FIG. 8 with box 62.

It is further noted that while the illustrated embodiment includes only a single strand of chain, alternative embodiments might include a plurality of strands which are joined together in a side-by-side manner. In such multi-strand embodiments, the offset links in each strand are typically positioned next to each other in a side-by-side arrangement in the chain.

In many applications, involving roller chains having an offset link, it is the offset link that presents the weakest link and typically is the point of failure of such chains. Roller chain 20 disclosed herein provides a chain wherein the offset link plates 26 are at least as strong as the inner and outer link plates 22, 24, whereby, statistically, chain 20 is more likely to fail at a location other than offset link 26 than at an offset link 26.

Figure 9:
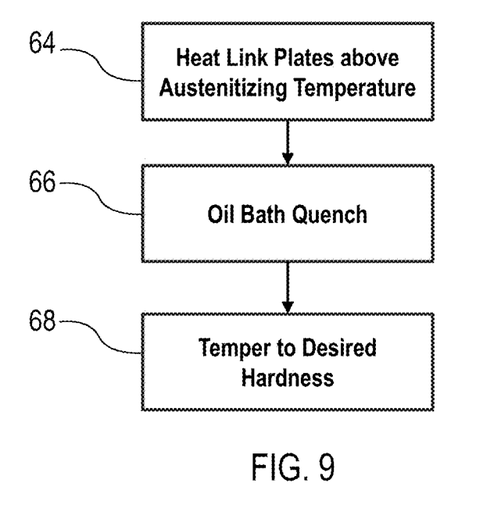
FIG. 9 is a flow chart depicting the manufacture of inner and outer link plates.

In roller chain 20, inner and outer link plates 22, 24 are made by the same process while offset link plates 28 are made according to a different process. The hardening process used to form inner and outer link plates 22, 24 is schematically depicted in FIG. 9. Link plates 22, 24 are first stamped from a carbon steel sheet material. Advantageously, link plates 22, 24 are formed out of a medium carbon steel having a carbon content of approximately 0.3 to 0.6 percent, or within the range of 0.37 to 0.5 percent carbon, such as AISI 1040 or AISI 1045 carbon steel. Alternative embodiments, however, may employ different steel materials, e.g., high carbon steel having a carbon content between 0.6 and 1.0 percent. It is noted that all such carbon content amounts used in the present disclosure are measured in accordance with industry standards and the percentages are by weight.

The process of hardening link plates 22, 24 involves heating the plates in a furnace above the austenitizing temperature of the steel, i.e., heating the steel above the temperature at which the steel changes its crystal structure to the more open structure of austenite which enables it to absorb carbon. This step is represented by box 64 in FIG. 9.

Link plates 22, 24 are then quenched in an oil bath as represented by box 66 in FIG. 9. Rapidly cooling the link plates 22, 24 below the martensite start temperature of the material causes the austenite to transform into martensite and is commonly done using an oil bath, however, alternative methods of quenching the plates at a temperature below the martensite start temperature may also be used.

After quenching link plates 22, 24, the plates are tempered to the desired hardness as represented by box 68 in FIG. 9. In the illustrated embodiment, the desired hardness is a Rockwell hardness within the range of 38-48 HRC. Tempering involves heating the link plates to a temperature below their critical point and then allowing the parts to cool, e.g., slowly cool in the ambient air, to thereby remove some of the hardness created in the quenching process. The resulting microstructure of the steel parts is a tempered martensite.

Offset link plates 28 are formed out of a different material and a different hardening process is used with offset link plates 28. Offset link plates 28 may advantageously be made by stamping the link plates from a sheet material made out of a carbon steel alloy, preferably, a carbon steel alloy with a relatively high chromium content. For example, the sheet material may be a steel alloy with a medium carbon content in the range of 0.3 to 0.6 percent, or, more specifically, within the range of 0.38 to 0.43 percent carbon. The steel alloy material advantageously also has a relatively high chromium content within the range of 0.4 to 1.1 percent. It is noted that all such chromium content amounts used in the present disclosure are measured in accordance with industry standards and the percentages are by weight. For example, steel alloys such as AISI 4140, 5140, or 8640 steel alloys or 40Cr, 42CrMo, 40Cr, or 40CrNiMo steel alloys, may be used. Depending upon the application and other chain components, alternative embodiments may also employ high carbon steels having a relatively high chromium content or a plain medium or high carbon steel that does not include a relatively high chromium content.

Figure 10:
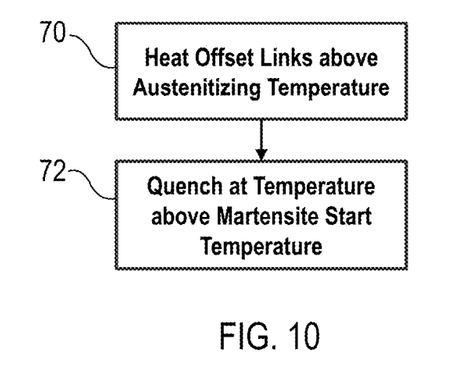
FIG. 10 is a flow chart depicting the manufacture of offset link plates.

The hardening process for offset link plates 28 is represented by the flowchart in FIG. 10. The offset link plates 28 are subjected to an austempering heat treatment process that generates a bainite microstructure instead of the tempered martensite microstructure of the inner and outer link plates 22, 24. As represented by box 70, the offset link plates 28 are heated in a furnace above the austenitizing temperature of the steel alloy forming plates 28. Then, as represented by box 72 in FIG. 10, the offset plates 28 are quenched at a temperature above the martensite start temperature of the steel alloy forming plates 28. In the illustrated embodiment, the plates 28 are quenched in a molten salt bath.

By quenching plates 28 quickly enough to avoid the formation of pearlite and at a relatively high temperature, e.g., above the martensite start temperature of the steel alloy, the resulting microstructure of offset link plates 28 is a bainite instead of a martensite. This quenching process brings the offset link plates 28 to their final desired hardness, i.e., within the Rockwell hardness range of 44 to 50 HRC, without any post-quenching tempering step. The resulting microstructure is bainite, which does not require tempering and which generates less distortion in the shape of the hardened material compared to conventional quenching and tempering producing a martensite microstructure. The ability of the offset link plates 28 to resist fatigue failure is also enhanced, in other words, they are more robust and have an enhanced fatigue strength.

Figure 11:
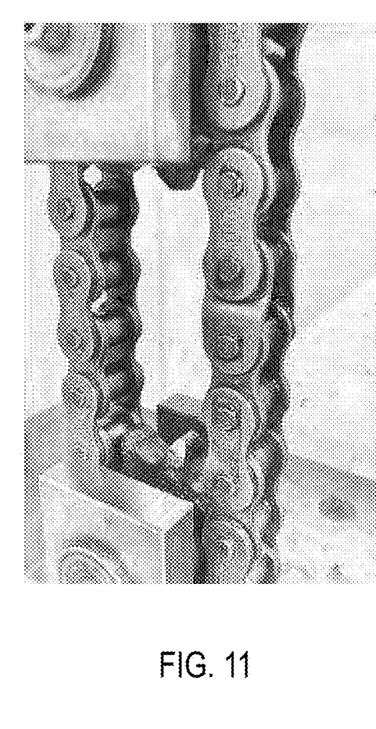
FIG. 11 is a photo depicting a roller chain testing procedure.

Testing was conducted to assess the strength of roller chains 20 having the construction described above. FIG. 11 is a photo of a roller chain in the testing apparatus. Three different roller chains were tested. Each of the roller chains had the same geometric shape and satisfied ANSI 80 which specifies a pitch (i.e., the distance between the axes of adjacent rollers) of 1.000 inches (25.40 mm); a roller diameter of 0.625 inches (15.88 mm); a link plate height of 0.949 inches (24.1 mm); a link plate thickness of 0.126 inches (3.2 mm); a pin diameter of 0.313 inches (7.94 mm); and a pin length of 1.289 inches (32.7 mm).

The first chain configuration (Baseline), included inner and outer link plates formed out of plain carbon steel and hardened in accordance with the heat-quench-temper process described above and represented in FIG. 9 to produce a martensite microstructure. This first chain configuration did not include any offset links.

The second chain configuration (Martensite Offset) included a single offset link and all of the inner link plates, outer link plates and offset link plates were formed out of plain carbon steel and hardened in accordance with the heat-quench-temper process described above and represented in FIG. 9 to produce a martensite microstructure.

The third chain configuration (Bainite Offset) included a single offset link. In this configuration, all of the inner and outer link plates were formed out of plain carbon steel and hardened in accordance with the heat-quench-temper process described above and represented by FIG. 9 to produce a martensite microstructure but the offset link plates were formed out of a high chromium steel alloy hardened in accordance with the austempering process described above and represented by FIG. 10 to produce a bainite microstructure.

The material and hardening process of the inner and outer link plates was identical for each of these three chain configurations. The only differences being the lack of an offset link (the first configuration) or the material and hardening process of the offset link (second and third configurations).

The test procedure was set up to test the link plates for fatigue resistance. In contrast to a test set up to test the durability of the wear components (i.e., the pins and bushings) for longevity. The test involved placing a variable tensile load on the chain wherein the section of the chain which was subjected to the load included the offset link (in the second and third chain configurations) was subjected to the load. The load varied from a maximum load of 36.25 kN to a minimum load of 4 kN and the load oscillated between these two values at a rate of 52 Hertz (plus or minus 1 Hertz).

After subjecting numerous chains of each configuration to this test, it was found that the first configuration (Baseline) chain took between 349 and 419 K cycles before it failed. The primary point of failure being the inner link plate.

Figure 12:
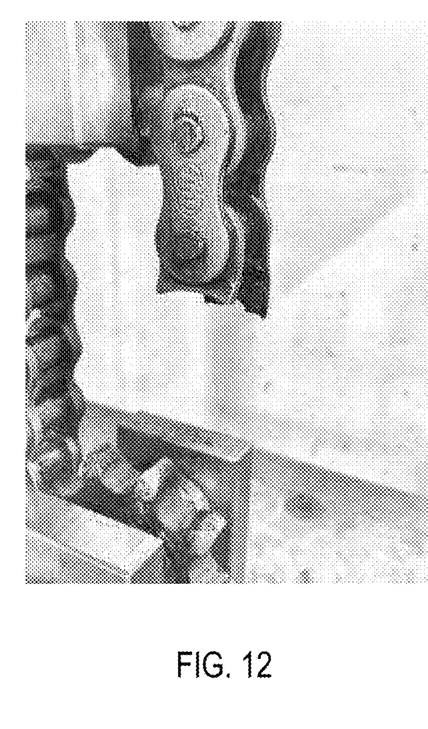
FIG. 12 is a photo depicting a roller chain that has failed at the offset link in a testing procedure.

The results for the second configuration (Martensite Offset) chain found that this configuration failed between 109 and 150 K cycles and the that primary point of failure was the offset link. FIG. 12 presents a photograph of a failed offset link of this second chain configuration. Thus, the conventional offset link configuration failed at approximately ⅓ the number of cycles of the baseline chain configuration.

The results for the third configuration (Bainite Offset) chain found that this configuration failed between 346 and 437 K cycles, or, roughly equivalent to the baseline configuration. The primary point of failure was the inner link plate, the same component whose failure determined the fatigue strength of the baseline chain configuration. Thus, the inner link plate was the weak link and the strength of the offset link plate in the third configuration did not determine the fatigue strength of the roller chain assembly.

While this invention has been described as having an exemplary design, the present invention may be further modified within the spirit and scope of this disclosure. This application is therefore intended to cover any variations, uses, or adaptations of the invention using its general principles.

What is claimed is:

1. A roller chain comprising:
a plurality of inner link plate pairs and a plurality of outer link plate pairs wherein the plurality of inner link plate pairs and the plurality of outer link plate pairs alternate along the length of the roller chain and wherein the plurality of inner link plate pairs and the plurality of outer link plate pairs are all formed out of a first planar sheet material;
a plurality of roller assemblies centrally positioned at regularly spaced intervals along the chain length and extending between individual link plates forming the plurality of inner link plate pairs;
an offset link which includes a pair of offset link plates, the offset link having a first end connected to one inner link plate pair of the plurality of inner link plate pairs, the offset link having a second end connected to one outer link plate pair of the plurality of outer link plate pairs wherein the offset link plates are formed out of a second sheet material having an inner plate section disposed in a first plane at the first end, an outer plate section disposed in a second plane at the second end wherein the first plane is parallel with the second plane and a transition section connects the inner plate section and the outer plate section, and wherein the roller chain has only one offset link; and
wherein the first planar sheet material and the second sheet material are formed out of different materials and the pair of offset link plates have a greater fatigue strength than at least one of the plurality of inner link plate pairs and the plurality of outer link plate pairs.

2. The roller chain of claim 1 wherein the pair of offset link plates are formed out of an austempered steel material having a bainitic microstructure.

3. The roller chain of claim 2 wherein the plurality of inner link plate pairs and the plurality of outer link plate pairs are formed of a hardened carbon steel material having a tempered martensite microstructure.

4. The roller chain of claim 3 wherein the plurality of inner link plate pairs and the plurality of outer link plate pairs have a Rockwell hardness within a range extending from 38 to 48 HRC and the offset link plates have a Rockwell hardness within a range extending from 44 to 50 HRC.

5. The roller chain of claim 3 wherein the pair of offset link plates are formed of a steel alloy having a chromium content within a range extending from 0.4% to 1.1% (by weight) and a carbon content within a range extending from 0.3% to 0.6% (by weight).

6. The roller chain of claim 5 wherein the plurality of inner link plate pairs and the plurality of outer link plate pairs are formed of a steel alloy having a carbon content within a range extending from 0.3% to 1.0% (by weight).

7. The roller chain of claim 3 wherein individual plates of the plurality of inner link plate pairs, the plurality of outer link plate pairs and the pair of offset link plates all have a common thickness.

8. The roller chain of claim 7 wherein the plurality of inner link plate pairs and the plurality of outer link plate pairs have a Rockwell hardness within a range extending from 38 to 48 HRC and are formed of a steel alloy having a carbon content within a range extending from 0.3% to 1.0% (by weight); and
the pair of offset link plates have a Rockwell hardness within a range extending from 44 to 50 HRC and are formed of a steel alloy having a chromium content within a range extending from 0.4% to 1.1% (by weight) and a carbon content within a range extending from 0.3% to 0.6% (by weight).

9. A method of manufacturing the roller chain of claim 1, comprising:
forming a plurality of inner link plates and a plurality of outer link plates out of a carbon steel material by:
(a) heating the plurality of inner link plates and the plurality of outer link plates to a temperature above the austenitizing temperature of the carbon steel material;
(b) quenching the plurality of inner link plates and the plurality of outer link plates to rapidly cool the plurality of inner link plates and the plurality of outer link plates to a temperature below the martensite start temperature of the carbon steel material; and
(c) tempering the plurality of inner link plates and the plurality of outer link plates;
forming the pair of offset link plates out of a steel alloy by:
(a) heating the pair of offset link plates to a temperature above the austenitizing temperature of the steel alloy; and
(b) quenching the pair of offset link plates by rapidly cooling the pair of offset link plates to a temperature above the martensite start temperature of the steel alloy;
assembling the plurality of inner link plates, the plurality of outer link plates and the plurality of roller assemblies together to form a length of chain having pairs of the inner link plates alternate with pairs of the outer link plates and wherein the pair of offset link plates connect one of the pairs of the inner link plates to one of the pairs of the outer link plates.

10. The method of claim 9 wherein the steel alloy forming the pair of offset link plates has a chromium content within a range extending from 0.4% to 1.1% (by weight) and a carbon content within a range extending from 0.3% to 0.6% (by weight) and wherein, after quenching the pair of offset link plates, the pair of offset link plates have a Rockwell hardness within a range extending from 44 to 50 HRC.

11. The method of claim 10 wherein the pair of offset link plates are quenched in a molten salt bath.

12. The method of claim 10 wherein the carbon steel material forming the plurality of inner link plates and the plurality of outer link plates has a carbon content within a range extending from 0.3% to 1.0% (by weight) and wherein, after quenching the plurality of inner link plates and the plurality of outer link plates, the plurality of inner link plates and the plurality of outer link plates have a Rockwell hardness within a range extending from 38 to 48 HRC.

13. The method of claim 12 wherein the plurality of inner link plates and the plurality of outer link plates are quenched in an oil bath and are tempered by allowing the plurality of inner link plates and the plurality of outer link plates to cool by losing heat to the ambient air; and
   wherein the pair of offset link plates are quenched in a molten salt bath.

14. The method of claim 9 further comprising:
   stamping the plurality of inner link plates and the plurality of outer link plates from a sheet of the carbon steel material before the step of heating the plurality of inner link plates and the plurality of outer link plates;
   stamping the pair of offset link plates from a sheet of the steel alloy and bending the individual offset link plates stamped from the sheet of the steel alloy at a transition section of the offset link plates whereby the individual offset link plates have an inner plate section disposed in a first plane, an outer plate section disposed in a second plane parallel with the first plane and the transition section connects the inner plate section and the outer plate section;
   and wherein individual plates of the plurality of inner link plates, the plurality of outer link plates and the pair of offset link plates all have a common thickness.

15. The method of claim 14 wherein the carbon steel material forming the plurality of inner link plates and the plurality of outer link plates has a carbon content within a range extending from 0.3% to 1.0% (by weight) and wherein, after quenching the plurality of inner link plates and the plurality of outer link plates, the plurality of inner link plates and the plurality of outer link plates have a Rockwell hardness within a range extending from 38 to 48 HRC; and
   wherein the steel alloy forming the pair of offset link plates has a chromium content within a range extending from 0.4% to 1.1% (by weight) and a carbon content within a range extending from 0.3% to 0.6% (by weight) and wherein, after quenching the pair of offset link plates, the pair of offset link plates have a Rockwell hardness within a range extending from 44 to 50 HRC.

16. The method of claim 15 wherein the plurality of inner link plates and the plurality of outer link plates are quenched in an oil bath and are tempered by allowing the plurality of inner link plates and the plurality of outer link plates to cool by losing heat to the ambient air; and
   wherein the pair of offset link plates are quenched in a molten salt bath.

17. A roller chain comprising:
   a plurality of inner link plate pairs and a plurality of outer link plate pairs wherein the plurality of inner link plate pairs and the plurality of outer link plate pairs alternate along the length of the roller chain and wherein the plurality of inner link plate pairs and the plurality of outer link plate pairs are all formed out of a first planar sheet material;
   a plurality of roller assemblies centrally positioned at regularly spaced intervals along the chain length and extending between individual link plates forming the plurality of inner link plate pairs;
   an offset link which includes a pair of offset link plates, the offset link having a first end connected to one inner link plate pair of the plurality of inner link plate pairs, the offset link having a second end connected to one outer link plate pair of the plurality of outer link plate pairs wherein the offset link plates are formed out of a second sheet material having an inner plate section disposed in a first plane at the first end, an outer plate section disposed in a second plane at the second end wherein the first plane is parallel with the second plane and a transition section connects the inner plate section and the outer plate section, and wherein the roller chain has only one offset link;
   wherein individual plates of the plurality of inner link plate pairs, the plurality of outer link plate pairs and the pair of offset link plates all have a common thickness;
   the first planar sheet material and the second sheet material being formed out of different materials wherein the first planar sheet material is a hardened carbon steel material having a tempered martensite microstructure; and
   the second sheet material is an austempered steel material having a bainitic microstructure having a Rockwell hardness within a range extending from 44 to 50 HRC and has a chromium content within a range extending from 0.4% to 1.1% (by weight) and a carbon content within a range extending from 0.3% to 0.6% (by weight).

18. The roller chain of claim 17 wherein the hardened carbon steel material forming the plurality of inner link plate pairs and the plurality of outer link plate has a carbon content within a range extending from 0.3% to 1.0% (by weight).

19. The roller chain of claim 18 wherein the individual link plates forming the plurality of inner link plate pairs and the outer link plate pairs all have the same shape.

* * * * *